United States Patent [19]
Neville

[11] Patent Number: 5,862,933
[45] Date of Patent: Jan. 26, 1999

[54] PORTABLE LAP TRAY

[76] Inventor: Boyd A. Neville, P.O. Box 3090, St. George, Utah 84771

[21] Appl. No.: 963,634

[22] Filed: Oct. 6, 1997

[51] Int. Cl.⁶ .................................................. B65D 25/20
[52] U.S. Cl. .......................... 220/17.1; 220/7; 220/495; 220/603; 108/43; 224/170; 224/901.4
[58] Field of Search ............... 220/7, 495, 603, 220/17.1; 108/43; 224/170, 901.4

[56] References Cited

U.S. PATENT DOCUMENTS

| | | | |
|---|---|---|---|
| 2,039,922 | 5/1936 | Neats et al. | 108/24 |
| 2,663,603 | 12/1953 | Newman | 108/43 |
| 4,243,249 | 1/1981 | Goss | 108/43 |
| 5,069,375 | 12/1991 | Flick | 108/43 |
| 5,170,917 | 12/1992 | Tourigny | 224/901.4 X |
| 5,176,274 | 1/1993 | Jenkins | 220/17.1 |
| 5,221,032 | 6/1993 | Bott et al. | 224/901.4 X |
| 5,425,455 | 6/1995 | Miller et al. | 224/901.4 X |

FOREIGN PATENT DOCUMENTS 2083337  3/1982  United Kingdom ................... 224/168

Primary Examiner—Stephen Castellano

[57] ABSTRACT

A new portable lap tray for securing to a user's thighs for use inside of a vehicle. The inventive device includes a tray portion having a generally rectangular configuration. The tray portion includes an upper surface and a lower surface. The upper surface has a circular recess formed therein. The tray portion is defined by a long forward edge, a long rearward edge and opposed short side edges. The long forward edge curves inwardly at a central extent thereof. The long rearward edge and the opposed short side edges have a continuous upwardly extending peripheral ridge. The tray is securable to the thighs of a user.

1 Claim, 2 Drawing Sheets

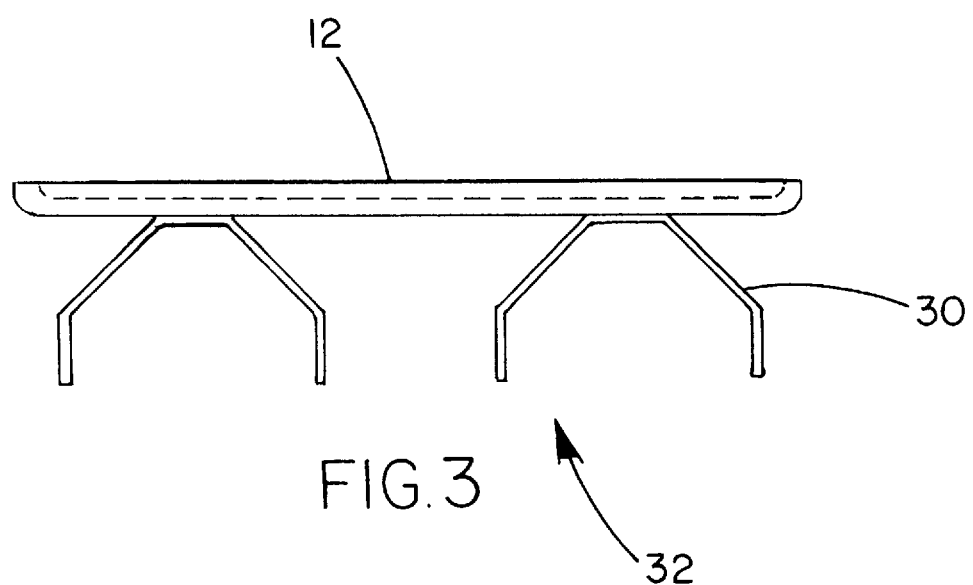

PORTABLE LAP TRAY

BACKGROUND OF THE INVENTION

1. Field of the Invention

The present invention relates to lap trays and more particularly pertains to a new portable lap tray for securing to a user's thighs for use inside of a vehicle.

2. Description of the Prior Art

The use of lap trays is known in the prior art. More specifically, lap trays heretofore devised and utilized are known to consist basically of familiar, expected and obvious structural configurations, notwithstanding the myriad of designs encompassed by the crowded prior art which have been developed for the fulfillment of countless objectives and requirements.

Known prior art lap trays include U.S. Pat. No. 4,765,583 to Tenner; U.S. Pat. No. 5,425,455 to Miller et al.; U.S. Pat. No. Des. 308,450 to Harris et al.; U.S. Pat. No. 4,423,249 to Goss; U.S. Pat. No. 5,209,370 to Pickett et al.; and U.S. Pat. No. Des. 331,330 to Bennett et al.

While these devices fulfill their respective, particular objectives and requirements, the aforementioned patents do not disclose a new portable lap tray. The inventive device includes a tray portion having a generally rectangular configuration. The tray portion includes an upper surface and a lower surface. The upper surface has a circular recess formed therein. The tray portion is defined by a long forward edge, a long rearward edge and opposed short side edges. The long forward edge curves inwardly at a central extent thereof. The long rearward edge and the opposed short side edges have a continuous upwardly extending peripheral ridge. The tray is securable to the thighs of a user.

In these respects, the portable lap tray according to the present invention substantially departs from the conventional concepts and designs of the prior art, and in so doing provides an apparatus primarily developed for the purpose of securing to a user's thighs for use inside of a vehicle.

SUMMARY OF THE INVENTION

In view of the foregoing disadvantages inherent in the known types of lap trays now present in the prior art, the present invention provides a new portable lap tray construction wherein the same can be utilized for securing to a user's thighs for use inside of a vehicle.

The general purpose of the present invention, which will be described subsequently in greater detail, is to provide a new portable lap tray apparatus and method which has many of the advantages of the lap trays mentioned heretofore and many novel features that result in a new portable lap tray which is not anticipated, rendered obvious, suggested, or even implied by any of the prior art lap trays, either alone or in any combination thereof.

To attain this, the present invention generally comprises a tray portion having a generally rectangular configuration. The tray portion includes an upper surface and a lower surface. The upper surface has a circular recess formed therein. The tray portion is defined by a long forward edge, a long rearward edge and opposed short side edges. The long forward edge curves inwardly at a central extent thereof. The long rearward edge and the opposed short side edges have a continuous upwardly extending peripheral ridge. A pair of securement straps are secured to and extend outwardly from one of the opposed short side edges of the tray portion. Free ends of the securement straps have hook and loop patches on opposing sides thereof.

A pair of receiving loops are secured to one of the opposed short side edges opposed from the pair of securement straps. The receiving loops are dimensioned for receiving the securement straps for securement around thigh's of a user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable lap tray apparatus and method which has many of the advantages of the lap trays mentioned heretofore and many novel features that result in a new portable lap tray which is not anticipated, rendered obvious, suggested, or even implied by any of the prior art lap trays, either alone or in any combination thereof.

It is another object of the present invention to provide a new portable lap tray which may be easily and efficiently manufactured and marketed.

It is a further object of the present invention to provide a new portable lap tray which is of a durable and reliable construction.

An even further object of the present invention is to provide a new portable lap tray which is susceptible of a low cost of manufacture with regard to both materials and labor, and which accordingly is then susceptible of low prices of sale to the consuming public, thereby making such portable lap tray economically available to the buying public.

Still yet another object of the present invention is to provide a new portable lap tray which provides in the apparatuses and methods of the prior art some of the advantages thereof, while simultaneously overcoming some of the disadvantages normally associated therewith.

Still another object of the present invention is to provide a new portable lap tray for securing to a user's thighs for use inside of a vehicle.

Yet another object of the present invention is to provide a new portable lap tray which includes a tray portion having a generally rectangular configuration. The tray portion includes an upper surface and a lower surface. The upper surface has a circular recess formed therein. The tray portion is defined by a long forward edge, a long rearward edge and opposed short side edges. The long forward edge curves inwardly at a central extent thereof. The long rearward edge and the opposed short side edges have a continuous upwardly extending peripheral ridge. The tray is securable to the thighs of a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front view of an alternate embodiment of the present invention.

DESCRIPTION OF THE PREFERRED EMBODIMENT

Figure 1:
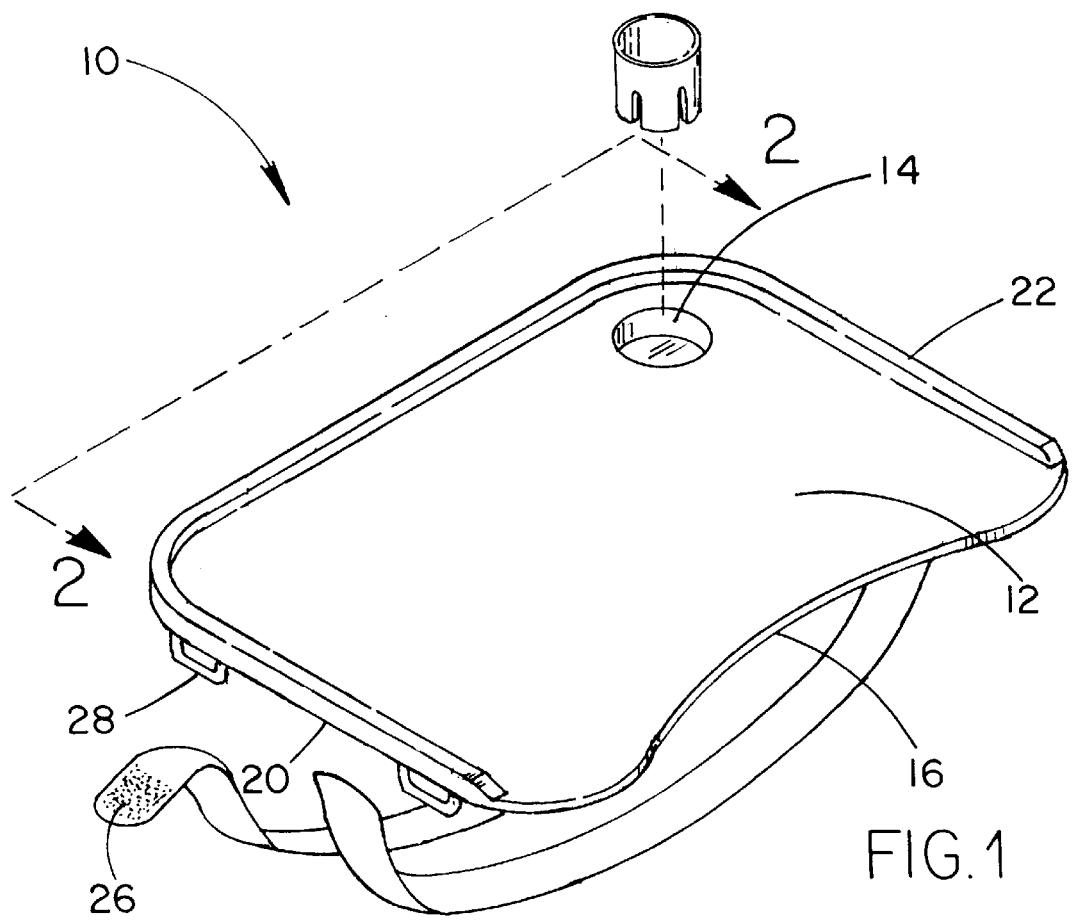
FIG. 1 is a perspective view of a new portable lap tray according to the present invention.
Figure 2:
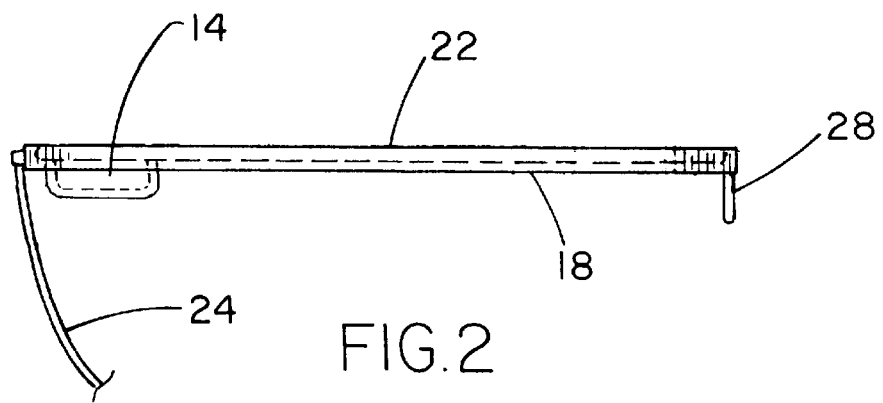
FIG. 2 is a front view of the present invention as taken along line 2—2 of FIG. 1.

With reference now to the drawings, and in particular to FIGS. 1 through 3 thereof, a new portable lap tray embodying the principles and concepts of the present invention and generally designated by the reference numeral 10 will be described.

As best illustrated in FIGS. 1 through 3, the portable lap tray 10 comprises a tray portion 12 having a generally rectangular configuration. The tray portion 12 includes an upper surface and a lower surface. The upper surface 12 has a circular recess 14 formed therein. The circular recess 14 is dimensioned for receiving a beverage container therein. The tray portion 12 is defined by a long forward edge 16, a long rearward edge 18 and opposed short side edges 20. The long forward edge 16 curves inwardly at a central extent thereof. The long rearward edge 18 and the opposed short side edges 20 have a continuous upwardly extending peripheral ridge 22. The ridge will preclude the inadvertent sliding of items positioned on the tray portion 12.

A pair of securement straps 24 are secured to and extend outwardly from one of the opposed short side edges 20 of the tray portion 12. Free ends of the securement straps 24 have hook and loop patches 26 on opposing sides thereof. A pair of receiving loops 28 are secured to one of the opposed short side edges 20 opposed from the pair of securement straps 24. The receiving loops 28 are dimensioned for receiving the securement straps 24 for securement around thigh's of a user.

An alternate embodiment of the present invention is illustrated in FIG. 3. This embodiment replaces the securement straps 24 and the receiving loops 28 with a pair of pliable clips 30. The pliable clips 30 are secured to the lower surface of the tray portion 12. The pliable clips 30 have an inverted generally U-shaped configuration which includes open lower ends 32 for engaging the thighs of the user.

In use, the present invention provides the occupant of a motor vehicle with a convenient area to do things which normally are difficult to do while riding in the motor vehicle. The tray portion 12 eliminates the need to juggle items in one's lap, thereby reducing the possibility of spills and other similar problems.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable lap tray for securing to a user's thighs for use inside of a vehicle comprising, in combination:

a tray portion having a generally rectangular configuration, the tray portion including a substantially planar upper surface for resting objects thereon and a lower surface, the upper surface having a circular recess formed therein for accepting a bottom portion of a beverage container, said circular recess being depressed below the substantially planar upper surface such that said recess does not protrude through the substantially planar upper surface, the tray portion being defined by a long forward edge, a long rearward edge and opposed short side edges, the long forward edge curving inwardly at a central extent thereof, the long rearward edge and the opposed short side edges having a continuous upwardly extending peripheral ridge; and a pair of securement straps coupled to and extending outwardly from a first one of the opposed short side edges of the tray portion;

a pair of integral receiving loops extending from a perimeter edge of the lower surface of the tray portion along a second one of the opposed short side edges opposite the first one of the opposed short side edges, the receiving loops dimensioned for receiving a free end of a respective one of the securement straps therethrough; and each free end of each securement strap having hook and loop fasteners thereon such that each securement strap is engagable to the receiving loop by inserting the free end through the receiving loop and engaging complimentary portions of the hook and loop fastener to each other.

* * * * *